Figure 1:
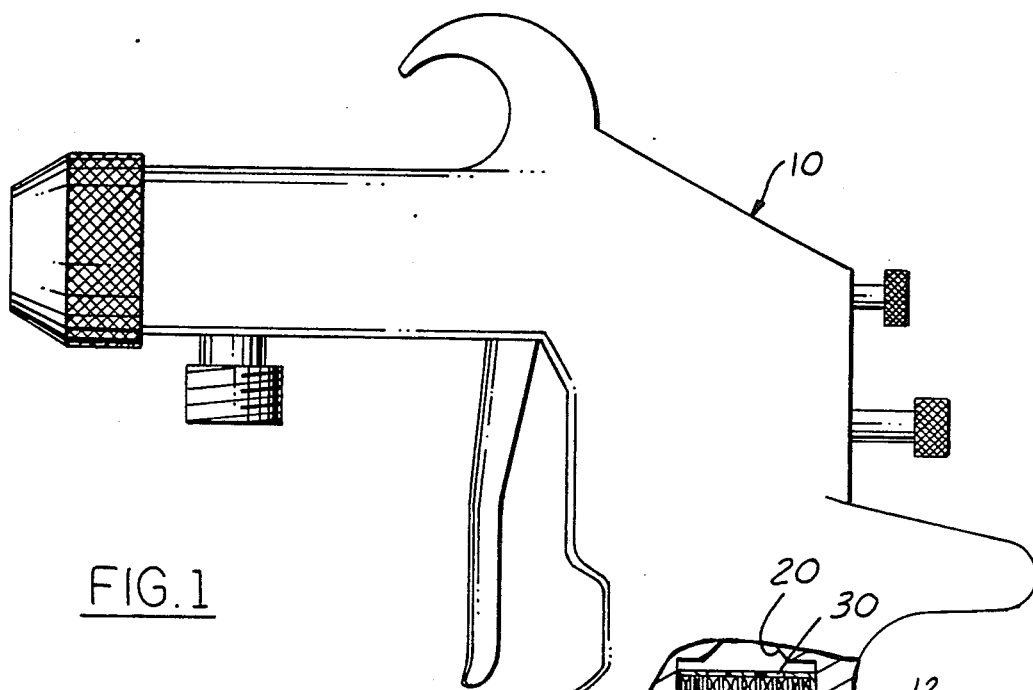

United States Patent [19]

Overby

[11] Patent Number: 4,810,272
[45] Date of Patent: Mar. 7, 1989

[54] AIR INLET VALVE ARRANGEMENT FOR PNEUMATIC EQUIPMENT

[75] Inventor: Kenneth W. Overby, Hamilton, Ind.

[73] Assignee: La-Man Corporation, Hamilton, Ind.

[21] Appl. No.: 115,109

[22] Filed: Nov. 2, 1987

[51] Int. Cl.$^4$ .............................................. B01D 51/00
[52] U.S. Cl. ........................................ 55/420; 55/505;
  55/DIG. 17; 137/540; 137/543.23; 210/234
[58] Field of Search ..................... 55/385 R, 420, 480,
  55/505, DIG. 17; 239/526, 527, 528, 575, 600;
  137/544, 329.1, 329.2, 329.4, 540, 543.23;
  210/234, 235

[56] References Cited

U.S. PATENT DOCUMENTS

| | | | |
|---|---|---|---|
| 3,272,337 | 9/1966 | Elwell | 210/235 X |
| 3,300,050 | 1/1967 | Perry | 210/234 |
| 3,327,858 | 6/1967 | Eddy et al. | 210/234 |
| 3,368,679 | 2/1968 | Bozek | 210/234 X |
| 3,688,910 | 9/1972 | Johnson et al. | 55/385 R X |
| 3,743,188 | 7/1973 | Wagner | 239/526 X |
| 4,116,650 | 9/1978 | Lane | 55/DIG. 17 X |
| 4,400,187 | 8/1983 | Lane | 55/DIG. 17 X |
| 4,464,186 | 8/1984 | Mann | 55/DIG. 17 X |

*Primary Examiner*—Charles Hart
*Attorney, Agent, or Firm*—Barnes & Thornburg

[57] ABSTRACT

An inlet valve and filter arrangement for pneumatic equipment in which a disposable filter and liquid evaporator cartridge is removably received within a cylindrical bore at the equipment inlet. A check valve is constructed normally to prevent passage of air therethrough to the pneumatic equipment, and includes a valve element for engaging the cartridge and thereby opening the valve when the cartridge has been properly inserted into the equipment housing. Thus, passage of air to the equipment for operating the same is permitted only when a filter and evaporator cartridge has been properly inserted therewithin.

12 Claims, 1 Drawing Sheet

U.S. Patent  Mar. 7, 1989  4,810,272

AIR INLET VALVE ARRANGEMENT FOR PNEUMATIC EQUIPMENT

The present invention is directed to an air inlet arrangement for pneumatic equipment, and more particularly to a filter cartridge and valve arrangement for preventing passage of air to the equipment in the event that the filter cartridge has not been inserted therein.

Prior art pneumatic filter and liquid evaporator assemblies are disclosed in U.S. Pat. Nos. 4,116,650, 4,400,187 and 4,464,186. Such assemblies typically comprise a disposable cartridge of water absorbent material positioned within a metal or plastic housing which is adapted for connection to a compressed air line. Water droplets and other matter entrained in the compressed air, which may damage the pneumatic equipment and/or cause improper operation of such equipment, are absorbed by the cartridge material, with the water then being re-evaporated as entrained vapor. However, since the disposable cartridge is entirely enclosed within the housing, a problem arises in that an operator cannot tell from observing the equipment and/or housing whether the cartridge has been properly inserted therewithin. Furthermore, under adverse conditions where the cartridge must be frequently replaced, there is a temptation simply to operate without the cartridge, which may lead to equipment damage and/or defective operation. In a pneumatic paint spray gun, for example, failure to employ a filter and evaporator cartridge in the compressed air line results in deposition of water droplets and other unfiltered particulate matter in the paint layer, resulting in paint defects and costly repair.

It is a general object of the present invention to provide an air inlet arrangement for pneumatic equipment which includes facility for removable insertion of a pneumatic filter and liquid evaporator cartridge of the character described above and means for inhibiting operation of such equipment when the cartridge has not been so inserted therewithin. A more specific object of the invention is to provide an inlet arrangement of the described character which embodies a check valve for engaging a properly inserted cartridge and permitting passage of air therethrough to the equipment only in the event of such proper cartridge insertion. According to the present invention, an air inlet apparatus is provided for pneumatic equipment. The apparatus includes a filter housing formed to include a filter chamber configured to receive a filter cartridge, inlet means for introducing air into the filter chamber, and outlet means for exhausting air from the filter chamber, and means for regulating a flow of air through the inlet means into the filter chamber.

The regulating means includes a hollow cap mounted in the inlet means in a fixed position and a flow control valve disposed in the hollow cap. The hollow cap includes an inlet port communicable with a source of air and an outlet port communicating with the filter chamber. The flow control valve is mounted in the outlet port for movement relative to the hollow cap between open positions permitting airflow through the hollow cap into the filter chamber and a closed position blocking airflow through the hollow cap into the filter chamber. The flow control valve is formed to include passageway means for conducting air through the flow control valve from an interior region of the hollow cap to the filter chamber upon movement of the flow control valve to an open position.

In preferred embodiments, spring means is disposed in the hollow cap for yieldably biasing the flow control valve to its closed position. The hollow cap further includes an interior wall configured to define said interior region. The flow control valve includes a valve stem slidably received in the outlet port of the hollow cap and a valve head disposed in said interior region of the hollow cap. The valve head is configured to include a valve surface confronting a portion of the interior wall. In an illustrated embodiment, the valve stem is formed to include the passageway means. The spring means acts between the valve head and another portion of the interior wall to urge the valve head toward the outlet port to a position in said interior region causing the valve surface to engage said confronting portion of the interior wall establishing a seal blocking transmission of air through the outlet port of the hollow cap into the filter chamber.

The valve stem includes a contact surface arranged to lie in the filter chamber upon movement of the flow control valve to its closed position. The contact surface is configured to engage a filter cartridge disposed in the filter chamber so that the flow control valve is moved against the spring means to an open position upon insertion of a filter cartridge into the filter chamber, thereby permitting airflow to pass through the hollow cap into the filter chamber whenever a filter cartridge is positioned in the filter chamber of the filter housing.

The hollow cap includes a hollow sleeve positioned in the inlet means and attached to the filter housing and an air inlet fitting, removably attached to the hollow sleeve. The hollow sleeve is formed to define the outlet port. The air inlet fitting is formed to define the inlet port. The hollow sleeve and the air inlet fitting cooperate to define said interior region of the hollow cap. In the illustrated embodiment, the spring means extends between the fixed air inlet fitting and the movable valve head normally to move the flow control valve to its closed position. The valve stem includes a proximal end coupled to the valve head, a distal end arranged to lie in the filter chamber upon movement of the flow control valve to its closed position, and an elongated member interconnecting the proximal and distal ends and slidably extending through the outlet port. Inlet port means is provided in the elongated member for admitting air into the passageway means. Further, outlet port means is provided in the distal end for exhausting air from the passageway means into the filter chamber.

The hollow cap includes a cylindrical interior wall defining the outlet port. The elongated member is cylindrically shaped to establish a sealing fit with the cylindrical interior wall of the hollow cup. Also, the elongated member is formed to include a longitudinally extending axial bore defining the passageway means and a plurality of circumferentially spaced inlet ports communicating with the axial bore to define the inlet port means.

Figure 2:
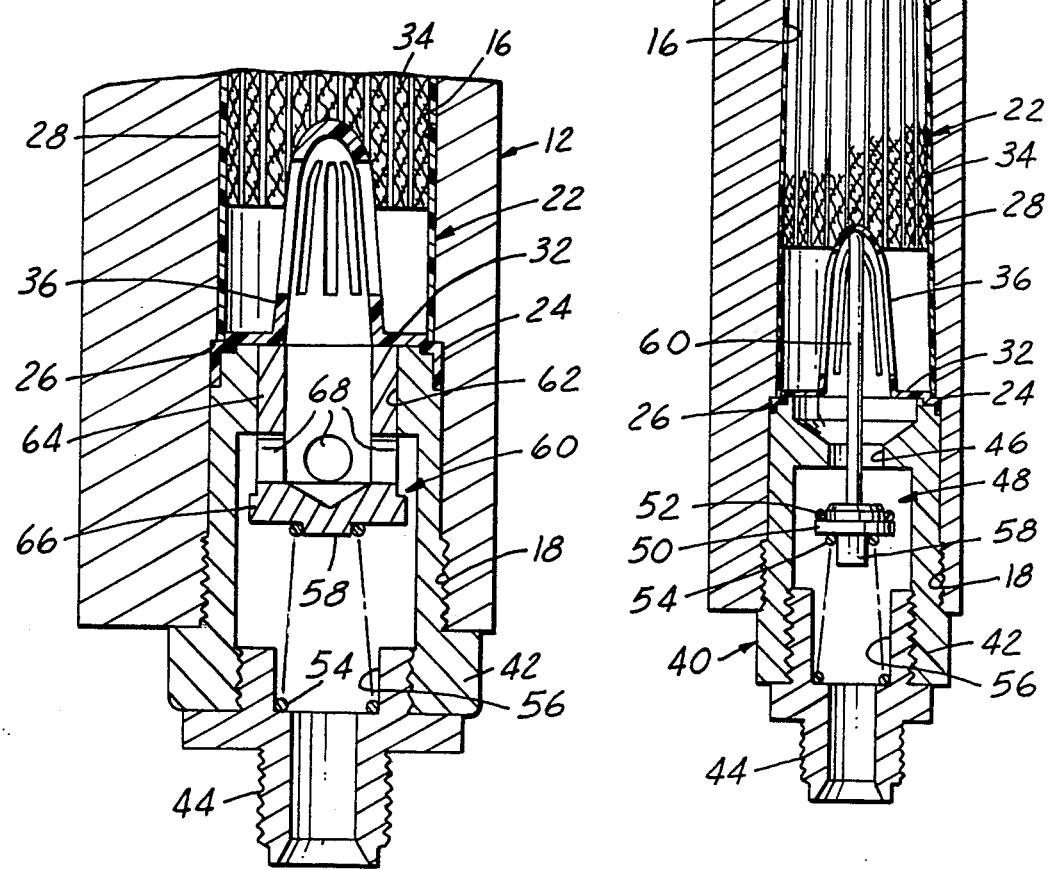

The invention, together with additional objects, features and advantages thereof, will be best understood from the following description, the appended claims and the accompanying drawing in which:

FIG. 1 is a partially sectioned elevational view of a pneumatic paint spray gun which features an inlet arrangement in accordance with one embodiment of the present invention; and FIG. 2 is a fragmentary sectional view which illustrates a modification to the inlet arrangement of FIG. 1.

Presently preferred embodiments of an air inlet arrangement for pneumatic equipment are described in the following text and illustrated in the accompanying drawing in combination with an air paint spray gun 10 of otherwise conventional construction. Although the inlet arrangement of the present invention finds particular utility in conjunction with such paint spray equipment, it will be appreciated that the principles of the invention are by no means limited to such application. Indeed, unless otherwise indicated, the term "pneumatic equipment" is employed in its broad sense to encompass any type of equipment operated by passage of compressed air therethrough.

The paint spray gun 10 illustrated in FIG. 1 possesses an integral handle 12 of cylindrical contour which encloses an air inlet valve arrangement 14 in accordance with one presently preferred embodiment of the invention. More specifically, handle 12 forms a metallic case containing a generally cylindrical bore 16 having a threaded opening 18 at the end of the handle and an axially aligned tapering passage 20 for feeding compressed air to the operating equipment of the gun. A pneumatic filter and liquid evaporator cartridge 22 of generally cylindrical outer contour is removably received lengthwise into bore 16 of handle 12, cartridge 22 having an enlargement of flange 24 at one axial end thereof which cooperates with a step 26 in bore 16 for preventing improper reverse insertion of cartridge 22 within handle 12. Cartridge 22 includes a cylindrical shell 28 having an apertured integral end wall 30 positioned adjacent to passage 20, and a separately formed end cap 32 from which flange 24 integrally projects. A plug 34 of wire and fabric knitted mesh construction is disposed within shell 28 for performing the vaporization and filtration functions. End cap 32 includes an apertured bullet-shaped projection 36 which holds plug 34 against end wall 30 and urges surrounding plug material radially against the sidewall of shell 28. Cartridge 22 is disclosed in greater detail in U.S. Pat. No. 4,464,186 assigned to the assignee hereof and incorporated herein by reference. A fine mesh screen (not shown) is added to the cartridge of that disclosure at end wall 30 to prevent passage of fine cloth particles to gun 10.

An end cap assembly 40 is removably threadably received into the open end 18 of handle 12 for capturing cartridge 22 therewithin. End cap assembly 40 includes a hollow sleeve 42 having external threads which engage opposing internal threads within handle opening 18, and internal threads at one end thereof for removably receiving an air inlet fitting 44 coaxially with sleeve 42 and bore 16. The opposing end of sleeve 42 is contoured to form a passage 46 of reduced diameter as compared with the diameter of bore 16. A valve 48 includes a head 50 having a radially and axially facing shoulder on which an O-ring 52 is mounted in axial opposition to an internal surface of sleeve 42 surrounding passage 46. A tapering coil spring 54 is captured in compression between fitting 44 and head 50 coaxially therewith, the base of spring 54 being received within a pocket 56 on fitting 44 and the narrow end of spring 54 encircling a boss 58 on head 50. Spring 54 thus urges head 50 and ring 52 into seating engagement with sleeve 42 at passage 46 for blocking flow of air therethrough. A valve stem 60 integrally axially projects from head 50 through passage 46 centrally to engage cartridge 22 within projection 36. The axial dimension of stem 60 is selected such that engagement thereof with cartridge 22 moves head 50 out of seating engagement with sleeve 42 against the force of spring 54.

In operation, valve head 50 is normally urged by spring 54 to seal passage 46 against flow of air through end cap assembly 40 to equipment 10 in the absence of a cartridge 22 tube properly inserted within bore 16. Thus, operation of equipment 10 is inhibited in the absence of such cartridge. However, when sleeve 42 is removed from handle opening 18 and a cartridge 22 properly is inserted therewithin, valve stem 60 engages the input end of the cartridge and, as sleeve 42 is reassembled to the handle end, urges valve head 50 out of sealing engagement at passage 46. Thus, compressed air may freely flow through fitting 44 around valve head 50 and through passage 46 to cartridge 22, and thence through passage 20 to equipment 10.

FIG. 2 illustrates a modified inlet valve 60 in which the outlet passage of sleeve 42 comprises a cylindrical bore 62 which slideably receives a cup-shaped valve element 64. The head 66 of element 64 is radially enlarged for internal engagement with sleeve 42 at passage 62 and thereby prevent removal of element 64 through passage 62. Circular ports or apertures 68 are formed in the sidewall of valve element 64 beneath and immediately adjacent to head 66 for permitting passage of air through the valve element when the element is engaged by cap 32 of cartridge 22 and urged thereby against the force of spring 54 to the position illustrated in FIG. 2. However, in the absence of such a cartridge 22, valve element 64 is urged against sleeve 42, thereby blocking apertures 68 within passage 62 and preventing flow of air therethrough.

The invention claimed is:

1. An air inlet apparatus for pneumatic equipment, the apparatus comprising
   a filter housing formed to include a filter chamber configured to receive a filter cartridge, inlet means for introducing air into the filter chamber, and outlet means for exhausting air from the filter chamber, and
   means for regulating a flow of air through the inlet means into the filter chamber, the regulating means including a hollow cap mounted in the inlet means in a fixed position and a flow control valve disposed in the hollow cap, the hollow cap including an inlet port communicable with a source of air and an outlet port communicating with the filter chamber, the flow control valve being mounted in the outlet port for movement relative to the hollow cap between open positions permitting airflow through the hollow cap into the filter chamber and a closed position blocking airflow through the hollow cap into the filter chamber, the flow control valve being formed to include passageway means for conducting air through the flow control valve from an interior region of the hollow cap to the filter chamber upon movement of the flow control valve to an open position.

2. The apparatus of claim 1, further comprising spring means disposed in the hollow cap for yieldably biasing the flow control valve to its closed position.

3. The apparatus of claim 2, wherein the hollow cap further includes an interior wall configured to define said interior region, the flow control valve includes a valve stem slidably received in the outlet port of the hollow cap and a valve head disposed in said interior region of the hollow cap and configured to include a valve surface confronting a portion of the interior wall, and the spring means acts between the valve head and another portion of the interior wall to urge the valve head toward the outlet port to a position in said interior region causing the valve surface to engage said confronting portion of the interior wall establishing a seal blocking transmission of air through the outlet port of the hollow cap into the filter chamber.

4. The apparatus of claim 3, wherein the valve stem includes a contact surface arranged to lie in the filter chamber upon movement of the flow control valve to its closed position and the contact surface is configured to engage a filter cartridge disposed in the filter chamber so that the flow control valve is moved against the spring means to an open position upon insertion of a filter cartridge into the filter chamber, thereby permitting airflow to pass through the hollow cap into the filter chamber whenever a filter cartridge is positioned in the filter chamber of the filter housing.

5. The apparatus of claim 3, wherein the hollow cap includes a hollow sleeve positioned in the inlet means and attached to the filter housing and an air inlet fitting removably attached to the hollow sleeve, the hollow sleeve is formed to define the outlet port, the air inlet fitting is formed to define the inlet port, the hollow sleeve and the air inlet fitting cooperate to define said interior region of the hollow cap, and the spring means extends between the fixed air inlet fitting and the movable valve head normally to move the flow control valve to its closed position.

6. The apparatus of claim 1, wherein the hollow cap further includes an interior wall configured to define said interior region, the flow control valve includes a valve stem slidably received in the outlet port of the hollow cap and a valve head disposed in said interior region of the hollow cap and configured to include a valve surface confronting a portion of the interior wall, and the valve stem is formed to include the passageway means.

7. The apparatus of claim 6, wherein the valve stem includes a proximal end coupled to the valve head, a distal end arranged to lie in the filter chamber upon movement of the flow control valve to its closed position, an elongated member interconnecting the proximal and distal ends and slidably extending through the outlet port, inlet port means provided in the elongated member for admitting air into the passageway means, and outlet port means provided in the distal end for exhausting air from the passageway means into the filter chamber.

8. The apparatus of claim 7, wherein the hollow cap includes a cylindrical interior wall defining the outlet port, the elongated member is cylindrically shaped to fit with the cylindrical interior wall of the hollow cup, and the elongated member is formed to include a longitudinally extending axial bore defining the passageway means and a plurality of circumferentially spaced inlet ports communicating with the axial bore to define the inlet port means.

9. The apparatus of claim 7, wherein the hollow cap includes an interior wall defining the outlet port, the inlet port means is positioned in confronting relation to said interior wall while the flow control valve is in its closed position to block admission of air into the passageway means through the inlet port means, the distal end includes a contact surface configured to engage a filter cartridge disposed in the filter chamber so that the inlet port means is moved away from confronting relation with the interior wall defining the outlet port to communicate with the interior region of the hollow cap to establish an open position of the flow control valve upon insertion of a filter cartridge into the filter chamber, thereby permitting airflow to pass through the hollow cap into the filled chamber whenever a filter cartridge is positioned in the filter chamber of the filter housing.

10. The apparatus of claim 6, wherein the distal end includes a contact surface configured to engage a filter cartridge disposed in the filter chamber so that the flow control valve is moved to an open position open insertion of a filter cartridge into the filter chamber, thereby permitting airflow to pass through the hollow cap into the filter chamber whenever a filter cartridge is positioned in the filter chamber of the first housing.

11. An air inlet apparatus for pneumatic equipment, the apparatus comprising a filter housing formed to include a filter chamber configured to receive a filter cartridge, inlet means for introducing air into the filter chamber, and outlet means for exhausting air from the filter chamber, and means for regulating a flow of air through the inlet means into the filter chamber, the regulating means including a hollow cap mounted in the inlet means in a fixed position and a flow control valve disposed in the hollow cap, the hollow cap including an inlet port communicable with a source of air and an outlet port communicating with the filter chamber, the flow control valve being mounted in the outlet port for movement relative to the hollow cap between open positions permitting airflow through the hollow cap into the filter chamber and a closed position blocking airflow through the hollow cap into the filter chamber, and spring means disposed inside the hollow cap for yieldably biasing the flow control valve to its closed position, the hollow cap including an interior wall configured to define a valve chamber interconnecting the inlet and outlet ports in fluid communication, the flow control valve including a valve stem extending through the outlet port of the hollow cap and a valve head disposed in the valve chamber, the spring means acting between the valve head and a portion of the interior wall normally to urge the flow control valve to its closed position, the hollow cap including a hollow sleeve positioned in the inlet means and attached to the filter housing and an air inlet fitting removably attached to the hollow sleeve, the hollow sleeve being formed to define the outlet port, the air inlet fitting being formed to define the inlet port, and the hollow sleeve and the air inlet fitting cooperating to define said valve chamber of the hollow cap, and the spring means extending between the fixed air inlet fitting and the movable valve head normally to move the flow control valve to its closed position.

12. The apparatus of claim 11, wherein the valve stem is an elongated rod having a proximal end attached to the valve head and a distal end providing a tip arranged to lie in the filter chamber upon movement of the flow control valve to its closed position and configured to engage a filter cartridge disposed in the filter chamber so that the flow control valve is moved against the spring means to an open position upon insertion of a filter cartridge into the filter chamber, thereby permitting airflow to pass through the hollow cap into the filler chamber whenever a filter cartridge is positioned in the filler chamber of the filler housing.

* * * * *